United States Patent Office 3,271,954
Patented Sept. 13, 1966

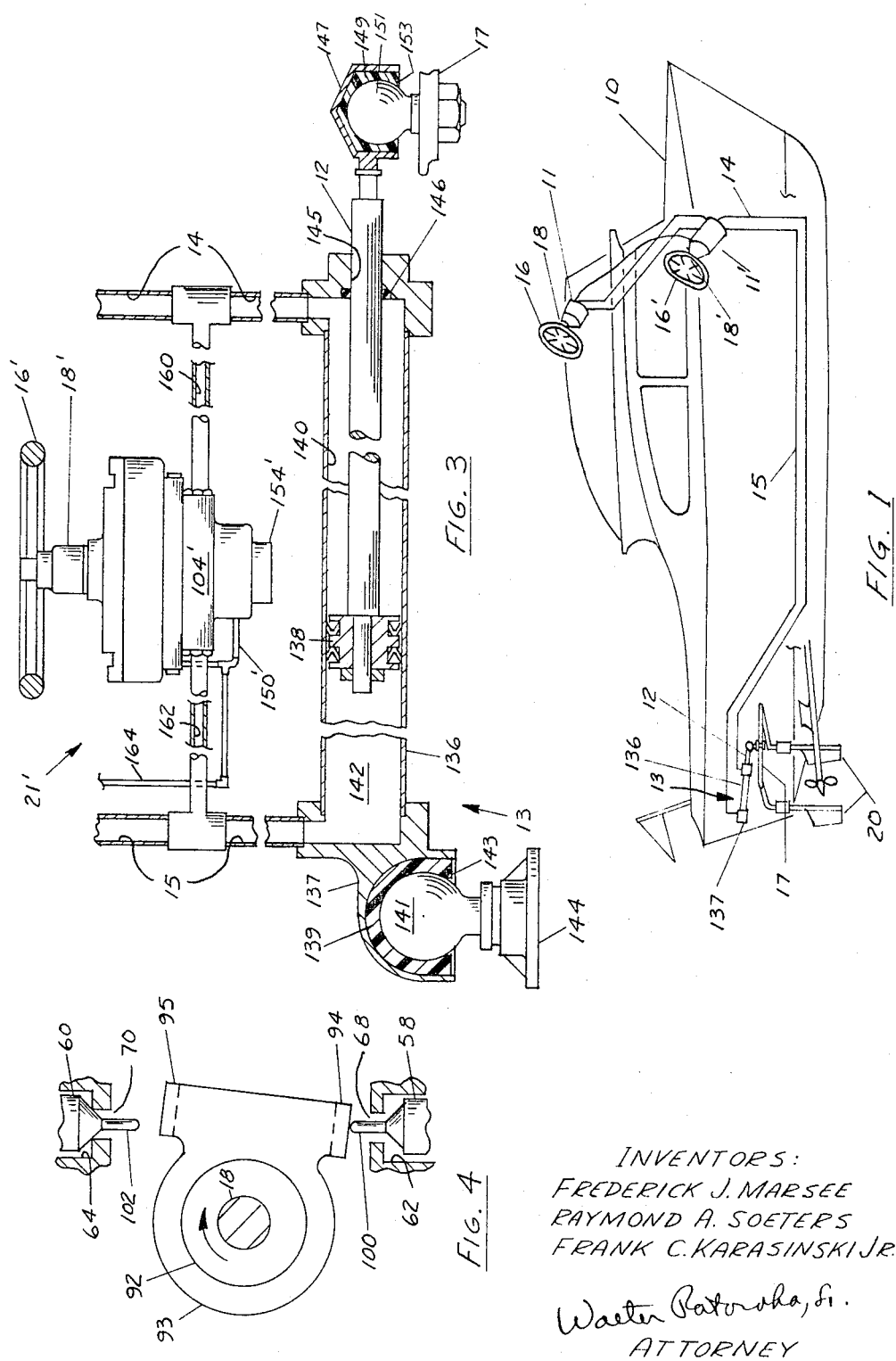

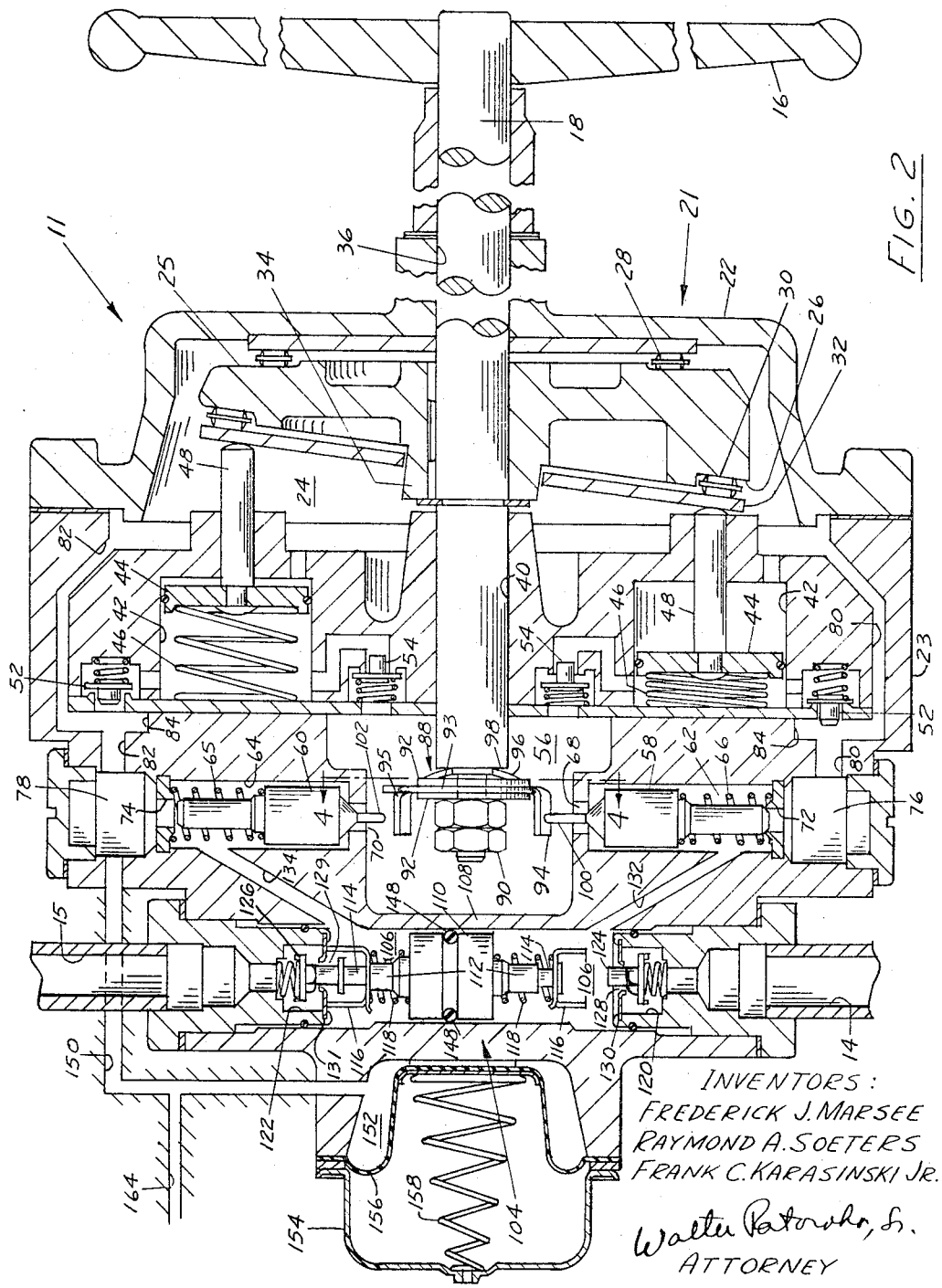

3,271,954
REMOTE CONTROL POSITIONING DEVICE
Frederick J. Marsee, Hazel Park, Raymond A. Soeters, Royal Oak, and Frank C. Karasinski, Jr., Utica, Mich., assignors to Holley Carburetor Company, Warren, Mich., a corporation of Michigan
Filed Mar. 30, 1965, Ser. No. 443,888
8 Claims. (Cl. 60—52)

This invention relates generally to remote control positioning devices, and more particularly to hydraulically operated servo and slave mechanisms applicable for, but not limited to, steering mechanisms for marine craft.

Prior art marine steering mechanisms have consisted primarily of rope and pulley, gear and chain, and various other types of mechanical systems, as well as hydraulic systems, such as double acting, worm gear fluid displacement units. All of the prior art systems have proven to be inefficient and/or cumbersome and/or expensive.

Specifically, in the rope and pulley system, the rope wears and breaks, the pulleys wear and become inoperable and constant adjustments have to be made to maintain proper tension on the rope. In the gear and chain systems, excessive lost motion is experienced at the wheel, constantly increasing as the joints and pivots wear, rudder feedback to the steering wheel is encountered, and noise occurs due to rattling of pipes and rods against the hull. Furthermore, in the gear and chain type system, gear boxes and joints must be kept well lubricated. In rack and pinion type, as well as the drum type, mechanical steering mechanism, lost motion is prevalent in driving the push-pull cable, by either the rack or the drum. Also, in the latter systems, occasional lubrication is required.

In some prior art hydraulic steering systems, the reservoir and relief valves are separately mounted assemblies, requiring considerable lengths of additional fluid lines, thereby enhancing the possibility of leakage and making more difficult the purging of the system during the fluid filling process.

Accordingly, a primary object of the invention is to provide an efficient, compact and relatively inexpensive hydraulic means for causing some movable member, such as a rudder attached to the slave unit, to move in either of two directions upon turning an operating member, such as a steering wheel or helm.

Another object of the invention is to provide such a means which automatically compensates for volume and temperature variations and which is completely self-lubricating.

A further object of the invention is to provide such a means which may be readily adaptable as a replacement unit for existing mechanical or hydraulic steering systems.

Still another object of the invention is to provide such a system which is easily adaptable to multiple-station installations and wherein movement of the rudder, or other device attached to the slave unit, is caused by turning any one of the steering wheels, or other operating members.

A still further object of the invention is to provide such a system wherein the slave unit requires considerably less space than conventional units and may serve to compensate for inherent unequal torque conditions on the rudder.

Other objects and advantages of the invention will become more apparent when reference is made to the following specification and the accompanying drawings wherein:

FIGURE 1 is a schematic illustration of a boat having dual hydraulic steering mechanisms embodying the invention;

FIGURE 2 is an enlarged partial schematic illustration of a portion of the invention;

FIGURE 3 is an enlarged schematic illustration of the remaining portion of the invention, the joinder of FIGURES 2 and 3 being accomplished at the broken ends of the conduits extending therefrom;

FIGURE 4 is a fragmentary view taken along the plane of line 4—4 of FIGURE 2 and looking in the direction of the arrows.

Referring now to the drawings in greater detail, FIGURE 1 illustrates a boat 10 having two servo units 11 and 11', both operatively connected to a piston rod 12 of a slave unit 13 by means of copper or other non-rusting hydraulic lines 14 and 15. A wheel or helm 16 and 16' is connected to each of the hydraulic servo units 11 through a shaft 18, while suitable linkage 17 connects the rod 12 to the usual rudders 20. Since only one rod 12 is involved, the linkage 17 is minimal. As will be explained later, turning either of the wheels 16 to the right will cause the rudders 20 to turn so as to move the boat to the right, and vice versa.

As better illustrated in FIGURE 2, the servo unit 11 comprises a pump housing 21, which may be made up of two sections 22 and 23, connected together in some suitable manner to form a reservoir chamber 24. The wheel 16 is secured to the shaft 18 which is keyed to an annular cam plate 25 having a bearing surface or race 26 on the inner side thereof which slants from a low to a high side, serving as a part of a so-called wobble plate type bi-directional pump, as will be explained later. There is a thrust bearing 28 between the cam plate 25 and the wall of the right hand housing 22 and another thrust bearing 30 between the bearing surface 26 and the plate 32 which may be freely mounted on the cam plate hub 34. The shaft 18 is supported within a bearing portion 36 on the right hand housing 22 and another bearing portion 40 in the left hand housing 23.

The left hand housing 23 is formed with a pulrality of annularly and equally spaced cylinders 42 (only two are shown, but six are employed in the device shown), the axes of which are parallel to each other and to the axis of the shaft 18. Each cylinder 42 has positioned therein a suitable sealed piston 44, which is loaded by a spring 46 so that a stem 48 extending therefrom engages the plate 32. It will thus be seen that, as the wheel 16 is turned, each piston 44 will be forced further into its respective cylinder 42 against the force of the spring 46, as the high side of the plate 32 engages the stem 48; the pistons 44 on the low side of the plate 32 being simultaneously returned by their respective springs 46. In order words, as the wheel 16 is turned, the pistons 44 will be moved successively in pumping and suction strokes.

The chamber 24 containing the cam plate 25 serves as a reservoir for the closed hydraulic fluid system, and the fluid therein serves to lubricate the moving parts, including the back side of the pistons 44. For each of the six cylinders 42, there is a spring loaded inlet check valve 52 and a spring loaded outlet check valve 54. A central high pressure chamber 56 is formed in the left hand housing member 23 and receives fluid through the outlet check valve 54 of each piston 44 that is moving in the pumping direction.

The higher pressure chamber 56 has associated therewith two identical, double ended valves 58 and 60, reciprocally mounted in chambers 62 and 64, respectively. Each of the valves 58 and 60 is loaded by a resilient means such as a spring 66 to limit operating pressure in the system to a predetermined amount, say 500 p.s.i., in a manner which will be described later.

Communication between the chamber 56 and the chambers 62 and 64 is via ports 68 and 70, respectively, the latter openings normally being closed off by the valves 58 and 60, respectively. Each of the chambers 62 and 64 include additional openings 72 and 74, respectively. These openings communicate with chambers 76 and 78, respectively, while passages 80 and 82 serve to communicate between their respective chambers 76 and 78 and the reservoir 24. An annulus 84 is formed around the passageways 80 and 82 adjacent the check valves 52 in order to provide communication between the piston chambers 42 and the passageways 80 and 82 whenever the valves 52 are open.

A clutch mechanism 88 is mounted on the end of the shaft 18 in the chamber 56 and held in place thereon in any suitable manner such as by nuts 90. The clutch mechanism 88 comprises a pair of friction disks 92 having a rocker type actuator 93 including arms 94 and 95 confined therebetween. A Belleville washer 96 is confined between one of the friction disks 92 and an abutment 98 formed on the shaft 18.

As previously mentioned, the valves 58 and 60 normally remain closed against ports 68 and 70. Stems 100 and 102 extend through the ports 68 and 70 into the chamber 56. The arms 94 and 95 are shaped such that, when they are rotated by the shaft 18, they will contact one or the other of the stems 100 or 102. In other words, a clockwise turn of the wheel 16 will cause the arm 94 (see FIGURE 4) to contact the stem 100, whereas a counterclockwise turn will cause the arm 95 to contact the stem 102 for a purpose to be described later.

A lockout system 104 is included in a chamber 106 of the housing 23, separated from the chamber 56 by a wall 108. A piston 110, including a central body having stepped extensions 112 and 114 extending from each end thereof, is slidably mounted in the chamber 106. A spider type stop member 116, loaded outwardly by a resilient means such as a spring 118, is loosely fitted on the smaller outer extension 114. A pair of smaller chambers 120 and 122 are formed at opposite ends of the chamber 106. A pair of spring loaded valves 124 and 126, within the chamber 120 and 122, respectively, serve to normally close ports 128 and 129 formed in members 130 and 131 to communicate with the chamber 106. A pair of passages 132 and 134 communicate between the chamber 106, on opposite ends of the piston 110, and the chambers 62 and 64.

The slave unit 13, illustrated in FIGURE 3, may include a cylindrical housing 136 wherein a piston 138 forms a movable wall between two chambers 140 and 142. The housing 136 has a hollow member 137 formed on one end thereof. A plastic cup-shaped member 139 is inserted in the member 137, while a ball connector 141 is inserted in the member 139. A collar 143 is formed around the inside edge of the member 139 to retain the ball connector 141. The latter is threadedly secured to a mounting bracket 144. The bracket 144 is located at the end of the housing 136 adjacent the chamber 142. Since the exposed areas of opposing sides of the piston 138 are different due to the area taken up by the piston rod 12, fluid admitted at a given pressure into chamber 142 would exert a greater force on the piston 138 than it would if it were admitted at the same given pressure into chamber 140. Hence, the bracket 144 is preferably mounted so that the larger area end of the housing 136 opposes the greater of two unequal torque conditions on a particular rudder due to engine characteristics, but may be mounted to suit any boat design.

The piston rod 12, being secured to one side of the piston 138, extends through the chamber 140 and out through an opening 145 formed in the end of the housing 136. A seal 146 may be provided to prevent leakage through the opening 145. The external portion of the rod 12 may be threadedly secured to a second hollow member 147, similar to member 137, which also includes a plastic insert 149. A second ball connector 151 is retained within the insert 149 by means of a collar 153. The connector 151 is threadedly secured to the linkage member 17. It is evident that the bracket 144 may be mounted in any radial direction relative to the linkage 17. It is also evident that the housing 136 may swing in any direction about the ball connector 141, as required by the reciprocating motion of the linkage 17. The previously mentioned conduits 14 and 15 communicate between chambers 140/120 and 142/122, respectively.

*Operation*

When the wheel 16 is rotated in a clockwise direction for example, the cam plate 25, which is secured thereto, will cause the plate 32 to move in a wobbling orbital path, without itself rotating. The plate 32, in turn, will progressively raise the pistons 44 by virtue of being in constant contact with the stems 48. The leftward movement (FIGURE 2) of the pistons 44 within the chambers 42 will force fluid through the check valve 54 into the central chamber 56. Of course, each of the pistons which is being lowered, or moved to the right in FIGURE 2, under the force of the spring 46 will be drawing fluid from the reservoir 24 through the check valve 52 into the chamber 42.

As the wheel 16 is thus rotated, the arm 94 (FIGURE 4) will contact the stem 100 and move the valve 58 away from the port 68 against the opposite port 72 (FIGURE 2). Once the valve 58 contacts the port 72, and the turning of the shaft 18 is continued, the actuating member 93, which is loosely fitted around the shaft 18 but confined between the fixedly secured friction disks 92, will stop against the stem 100 but will slip between the rotating disks 92.

In the condition of operation shown in FIGURES 2 and 4, fluid will pass from the chamber 56 through the port 68, the valve chamber 62 and passage 132 and into the chamber 106 on one side of the piston 110, and will then open the spring loaded valve 124 and permit the fluid to flow through the conduit 14 to the slave chamber 140 (FIGURE 3), tending to cause the slave piston 138 to move to the left in the figure. At the same time, the pressure of the above mentioned fluid will cause the piston 110, the body of which is provided with a ring seal 148, to move upwardly in FIGURE 2 so as to mechanically open the spring loaded valve 126.

It may be noted that, once the spider member 116 contacts the member 131, the piston 110 can continue to move upwardly in FIGURE 2, compressing the spring 118, until the center portion of the spider 116 contacts the shoulder formed between the two end portions 112 and 114.

The open valve 126 permits the fluid being displaced by the resultant movement of the piston 138 from the slave chamber 142 to return by way of the conduit 15, the chamber 122, the port 129, the upper end of the chamber 106, the passage 134, valve chamber 64, port 74 and the passage 82 to the reservoir 24. Some of the fluid from the chamber 78 may flow through a passage 150 to the variable volume chamber 152 of an accumulator 154. The variable volume chamber 152 is provided in conjunction with the slave piston structure involved here, since the fluid capacities of chambers 140 and 142 are different, due to the volume displaced by the piston rod 12. The variable volume chamber 152 includes, as a wall thereof, a convoluted type diaphragm 156 which is loaded by a spring 158 so as to maintain a slight positive pressure on the low pressure side of the piston 138. It may be noted that the reservoir 24 and the piston chambers 42 constitute a substantially constant volume at all times. Thus, when the slave piston 138 (FIGURE 3) is moving to the left and more fluid is being discharged from the chamber 142 than is entering the chamber 140, due to the single piston rod 12, the excess fluid will force the diaphragm 156 to the left against the force of the spring 158. Then, when the piston 138 is moving to the right, the resultant volume differential will be compensated for by movement of the diaphragm 156 to the right. Also, should pressures increase in the reservoir 24, due to temperature changes or other reasons, the resultant increased volume of fluid will merely accumulate within the variable volume chamber 152 via the reservoir 24.

It will be apparent that one complete revolution of the wheel 16 will actuate each of the six pistons 44 one time, and in sequence. A second revolution will actuate each of the pistons once again. The system is designed so that 3½ to 4 revolutions will supply sufficient fluid to move the slave piston 138 along the entire length of the cylinder 136, depending upon the direction of travel of the piston 138. When it reaches one end of the cylinder, the slave piston 138 cannot move any futher. Any further rotation of the wheel 16 will cause the pressure in the chamber 56 to increase by virtue of the pumping action of the pistons 44. When a predetermined pressure is exceeded in chamber 56, the valve 60 will be moved slightly away from the port 70, against the force of the spring 65, but will be prevented by the spring 65 from closing against the port 74. The excess fluid is thus bled off through the port 70, the valve chamber 64 and the port 74 to the reservoir 24 and/or the accumulator 154. This relief function would also occur, and thus protect the system, if the piston 138 were at an intermediate point and prevented from moving by some external force on the rod 12.

All the time that the wheel 16 is being turned in a counterclockwise direction, the arm 94 of the clutch mechanism 88 will be maintaining the valve 58 in the fully open position. When the rotation of the wheel is reversed, the clutch mechanism 88 rotates the arm 95 into contact with the valve 60, so as to cause fluid to flow through the other circuit to the slave chamber 142. At the same time, the free or floating piston 110 is moved to the other side of its chamber 106, allowing the fluid in the chamber 140 to return to the reservoir 24.

The above descripiton concerns operation of the system while the wheel 16 is being turned in either a clockwise or a counterclockwise direction. Once the operator stops applying a force on the wheel 16 in, say, a clockwise direction, the arm 94 of the friction clutch mechanism 88 will no longer be providing any pressure against the stem 100 and the spring 66 will thus be able to urge the valve 58 upwardly in the chamber 62 to close off the port 68. In its upward movement (FIGURE 4), the stem 100 will rotate the arm 94, the actuator 93, the friction disks 92, the shaft 18, and, hence, the wheel 16 through a negligible arc in a counterclockwise direction.

It is thus apparent that, so long as the wheel 16 is not being turned in either direction, both of the valves 58 and 60 will be closed, and, hence, movement of fluid into the chamber 106 is stopped. The spring 118 will return the piston 110 to its normal central position. Then, both of the valves 124 and 126 will be closed by the respective springs and the system will be locked to the extent that any forces on the rudder 20 (FIGURE 1) will merely produce a pressure within the chamber 140 or 142 and tend to more tightly close the valve 120 or 122, respectively, but will not be able to change the position of the rudder 20. In other words, the helmsman can take his hands off the wheel, and the craft will maintain the course until the wheel is moved again.

The above described locking feature makes possible the incorporation of an additional servo unit (or units) in a parallel circuit at some other station on the boat, in which event the craft will respond only to the particular wheel that is being turned. Such an additional unit is illustrated in FIGURE 3 as 21′ having associated therewith a second wheel 16′ and shaft 18′ and a second accumulator 154′ with its accompanying conduit 150′. A pair of conduits 160 and 162 serve to communicate between the lockout system (not shown) of the unit 21′ and the conduits 14 and 15 leading to the single slave unit 13. An additional conduit 164 is employed to communicate between the accumulator conduits 150 and 150′.

It should be apparent that the device described above represents a hydraulic control system which may be used to remotely control any movable member which might be actuated by a slave mechanism. It should also be apparent that the movable member will be actuated only by rotating the operating shaft of the servo system, and the position of the movable member may be controlled from any of two or more stations.

It should be further apparent that the system described is ideally suited for a steering mechanism for a marine craft, having many advantages over prior art devices, and that it may readily be installed as original equipment thereon or is easily adaptable as a replacement item for existing hydraulic steering systems.

Although but one embodiment of the invention has been shown and described, it is apparent that other modifications are possible within the scope of the appended claims.

What we claim as our invention is:

1. A positioning device, comprising a servo mechanism including a wobble plate type pump having a reservoir, a shaft connected at an intermediate point thereof to said pump and having one end thereof extending from said servo mechanism, a friction clutch mechanism mounted on the inner end of said shaft, a pair of actuating valves independently operated by said clutch mechanism depending upon the direction of rotation of said shaft, a plurality of pistons successively operated by rotation of said wobble plate pump, a conduitry system communicating between said pistons and the ends of said actuating valves, a lockout system, a pair of passageways communicating between said actuating valves and said lockout system, an accumulator and a conduit communicating between said reservoir and said accumulator; an external operable member fixedly secured to the extension of said shaft; and a slave mechanism including a housing having a piston slidably mounted therein, a piston rod extending from one end of said piston and out through one end of said housing, and a pair of conduits communicating between opposite ends of said piston and said lockout system.

2. A positioning device comprising a pair of servo mechanisms each including a wobble plate type pump including a reservoir, a shaft connected at an intermediate point thereof to said pump and having one end thereof extending from said servo mechanism, a friction clutch mechanism mounted on the inner end of said shaft, a pair of actuating valves independently operated by said clutch mechanism depending upon the direction of rotation of said shaft, a plurality of pistons successively operated by rotation of said wobble plate pump, a conduitry system communicating between said pistons and the ends of said actuating valves, a lockout system, a pair of passageways communicating between said actuating valves and said lockout system, an accumulator; and a conduit communicating between said reservoir and said accumulator; a pair of external operable members, one being fixedly secured to the extension of each of said shafts; and a slave mechanism including a housing having a piston slidably mounted therein, a piston rod extending from one end of said piston and out through one end of said housing, a pair of conduits communicating between opposite ends of said piston and each of said lockout systems, and a conduit communicating between the two accumulators.

3. A positioning device, comprising a servo mechanism including a shaft extending from said servo mechanism, a plate mounted on said shaft at an intermediate point thereof, said plate having a sloped face on one side thereof, a plurality of pistons successively operated by rotation of said plate, a central chamber, a plurality of passages communicating between said pistons and said central chamber, a pair of chambers adjacent said central chamber, each having an opening for communication with said central chamber, a pair of actuating valves in said pair of chambers, a second opening in each of said pair of chambers, resilient means for urging said actuating valves against said opening leading to said central chamber and away from said second opening, a plurality of passageways communicating between said second opening and said pistons, a slave mechanism, a pair of conduits communicating between said pair of chambers and opposite sides of said slave mechanism, an operating member connected to the extension of said shaft, means operably connected to the inner end of said shaft for actuating one or the other of said actuating valves upon rotation of said operating means, and means for preventing further movement of said slave mechanism at all times that said operating member is not being rotated.

4. A hydraulic steering device, comprising a servo mechanism including a shaft extending from said servo mechanism, a plate mounted on said shaft at an intermediate point thereof, said plate having a sloped face on one side thereof, a plurality of spring loaded pistons successively operated by rotation of said plate, a central chamber, a plurality of passages communicating between said pistons and said central chamber, a pair of chambers adjacent said central chamber, each having an opening for communication with said central chamber, a pair of actuating valves in said pair of chambers, a second opening in each of said pair of chambers, a spring for urging said actuating valves against said opening leading to said central chamber and away from said second opening, a plurality of passageways communicating between said second opening and said pistons, a separate housing, a piston slidably mounted in said separate housing, a rudder rotatably secured to said piston, a pair of conduits communicating between said pair of chambers and opposite sides of said piston, a steering wheel connected to the extension of said shaft, a friction clutch mechanism operably connected to the inner end of said shaft for actuating one or the other of said actuating valves upon rotation of said steering wheel, and means for preventing further movement of said piston at all times that said steering wheel is not being rotated.

5. The device described in claim 4, wherein said rudder is secured to a rod extending from one end of said piston by means of a ball socket arrangement and suitable linkage.

6. The device described in claim 4, wherein said separate housing is mounted at one end thereof by means of a pivotal mounting arrangement.

7. The device described in claim 6, wherein said pivotal mounting arrangement comprises a recessed extension formed on an end of said housing, a plastic cup-shaped insert mounted in said recessed extension, a ball connector mounted in said plastic insert, a collar formed around the inner edge of said insert for retaining said ball connector, and a mounting bracket threadedly connected to said ball connector.

8. The device described in claim 5, wherein said ball socket arrangement includes a recessed member threadedly connected to the outer end of said rod, a plastic cup-shaped insert mounted in said recessed member, a ball connector mounted in said plastic insert and a collar formed around the inner edge of said insert for retaining said ball connector, the outer end of said ball connector being threadedly connected to said linkage.

References Cited by the Examiner
UNITED STATES PATENTS

| | | | |
|---|---|---|---|
| 1,590,226 | 6/1926 | Boisset | 60—52 |
| 1,955,154 | 4/1934 | Temple | 60—52 |
| 2,368,659 | 2/1945 | Heineck et al. | 91—45 X |
| 2,410,978 | 11/1946 | Kelly | 60—52 |
| 2,755,625 | 7/1956 | Acton | 60—52 |

EDGAR W. GEOGHEGAN, *Primary Examiner.*